(12) United States Patent
Hamasaki et al.

(10) Patent No.: US 12,374,846 B2
(45) Date of Patent: Jul. 29, 2025

(54) ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Shinichi Hamasaki, Inukami-gun (JP); Takahisa Kakudo, Inukami-gun (JP); Rodrigo Kendy Yamashita, Inukami-gun (JP); Yoji Tajiri, Inukami-gun (JP)

(73) Assignees: FURUKAWA ELECTRIC CO., LTD, Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 355 days.

(21) Appl. No.: 17/950,108

(22) Filed: Sep. 22, 2022

(65) Prior Publication Data

US 2023/0015631 A1    Jan. 19, 2023

Related U.S. Application Data

(63) Continuation of application No. PCT/JP2021/008516, filed on Mar. 4, 2021.

(30) Foreign Application Priority Data

Mar. 25, 2020   (JP) .................................. 2020-054900

(51) Int. Cl.
*H01R 35/04*    (2006.01)
(52) U.S. Cl.
CPC ................... *H01R 35/04* (2013.01)

(58) Field of Classification Search
CPC ..................................................... H01R 35/04
(Continued)

(56) References Cited

U.S. PATENT DOCUMENTS 5,674,081 A     10/1997  Hoffmann et al.
5,871,366 A *    2/1999  Nishikigi .............. B60R 16/027
                                                              439/15

(Continued)

FOREIGN PATENT DOCUMENTS

EP          0823352        2/1998
JP          08-507644      8/1996
(Continued)

OTHER PUBLICATIONS

Extended European Search Report for corresponding EP Application No. 21775278.1-1201, Jul. 18, 2023.
(Continued)

*Primary Examiner* — Harshad C Patel
(74) *Attorney, Agent, or Firm* — Mori & Ward, LLP

(57) ABSTRACT

A rotary connector device includes a stator, a rotator, a first connector, and a second connector. The stator is configured to be attached to a vehicle body. The rotator is provided rotatably about a rotation axis with respect to the stator. The first connector is provided at the stator. The second connector is provided at the rotator. The first connector includes a first connector housing space in which a vehicle-body-side connector is disposed in a state where the vehicle-body-side connector is electrically connected to the first connector. When viewed from an axial direction defined along the rotation axis in a state where the stator is attached to the vehicle body, the first connector housing space is disposed not to overlap a vertical plane including the rotation axis.

19 Claims, 5 Drawing Sheets

(58) Field of Classification Search
USPC ........................................................ 439/15
See application file for complete search history.

(56) References Cited

U.S. PATENT DOCUMENTS

| | | | | |
|---|---|---|---|---|
| 6,343,946 | B1* | 2/2002 | Matsumoto | H01R 35/02 |
| | | | | 439/164 |
| 6,548,773 | B2* | 4/2003 | Matsumoto | B60Q 1/1461 |
| | | | | 200/61.54 |
| 10,651,617 | B1* | 5/2020 | Saito | H05K 1/147 |
| 10,686,286 | B2* | 6/2020 | Ushiyama | H01R 35/025 |
| 10,693,267 | B2* | 6/2020 | Yamanishi | B62D 15/0215 |
| 10,833,466 | B2* | 11/2020 | Yamashita | H01R 13/66 |
| 10,981,525 | B2* | 4/2021 | Hiroki | B60R 16/027 |
| 11,325,545 | B2* | 5/2022 | Utsunomiya | B62D 15/021 |
| 11,692,609 | B2* | 7/2023 | Satoshi | F16F 15/04 |
| | | | | 248/638 |
| 2003/0075426 | A1 | 4/2003 | Takahashi et al. | |
| 2012/0329314 | A1* | 12/2012 | Adachi | H01R 35/04 |
| | | | | 439/501 |
| 2013/0115785 | A1* | 5/2013 | Kamiya | H01R 39/64 |
| | | | | 439/15 |
| 2014/0051267 | A1 | 2/2014 | Asakura et al. | |
| 2020/0001805 | A1 | 1/2020 | Hiroki | |
| 2020/0161819 | A1 | 5/2020 | Saito et al. | |

FOREIGN PATENT DOCUMENTS

| | | |
|---|---|---|
| JP | 10-172705 | 6/1998 |
| JP | 2001-135443 | 5/2001 |
| JP | 2003-54332 | 2/2003 |
| JP | 2005-327575 | 11/2005 |
| JP | 2009-080958 | 4/2009 |
| JP | 2010-129187 | 6/2010 |
| JP | 2014-039438 | 2/2014 |
| JP | 2019-029082 | 2/2019 |
| WO | WO2018/147448 | 8/2018 |
| WO | WO2019/038992 | 2/2019 |

OTHER PUBLICATIONS

Japanese Office Action for corresponding JP Application No. 2022-509478, Jul. 9, 2024 (w/ English machine translation).
Written Opinion for corresponding International Application No. PCT/JP2021/008516, Oct. 6, 2022.
International Search Report for corresponding International Application No. PCT/JP2021/008516, Apr. 27, 2021.
Japanese Office Action for corresponding JP Application No. 2022-509478, Nov. 19, 2024 (w/ English machine translation).
Korean Office Action for corresponding KR Application No. 10-2022-7037205, Feb. 13, 2025 (w/ English machine translation).
European Office Action for corresponding EP Application No. 21775278.1-1201, May 6, 2025.
Chinese Office Action for corresponding CN Application No. 202180023721.2, Jun. 7, 2025 (w/ English machine translation).

\* cited by examiner

ROTARY CONNECTOR DEVICE

CROSS-REFERENCE TO RELATED APPLICATIONS

The present application is a continuation application of International Application No. PCT/JP2021/008516, filed Mar. 4, 2021, which claims priority to Japanese Patent Application No. 2020-054900 filed Mar. 25, 2020. The contents of these applications are incorporated herein by reference in their entirety.

BACKGROUND

Technical Field

The technology disclosed herein relates to a rotary connector device.

Background Art

Japanese Unexamined Patent Publications JP 2005-327575A and JP 2010-129187A and International Publication WO 2018/147448 describe a rotary connector device having a stationary-side connector.

SUMMARY

A rotary connector device includes a stator, a rotator, a first connector, and a second connector. The stator is configured to be attached to a vehicle body. The rotator is provided rotatably about a rotation axis with respect to the stator. The first connector is provided at the stator. The second connector is provided at the rotator. The first connector includes a first connector housing space in which a vehicle-body-side connector is disposed in a state where the vehicle-body-side connector is electrically connected to the first connector. When viewed from an axial direction defined along the rotation axis in a state where the stator is attached to the vehicle body, the first connector housing space is disposed not to overlap a vertical plane including the rotation axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
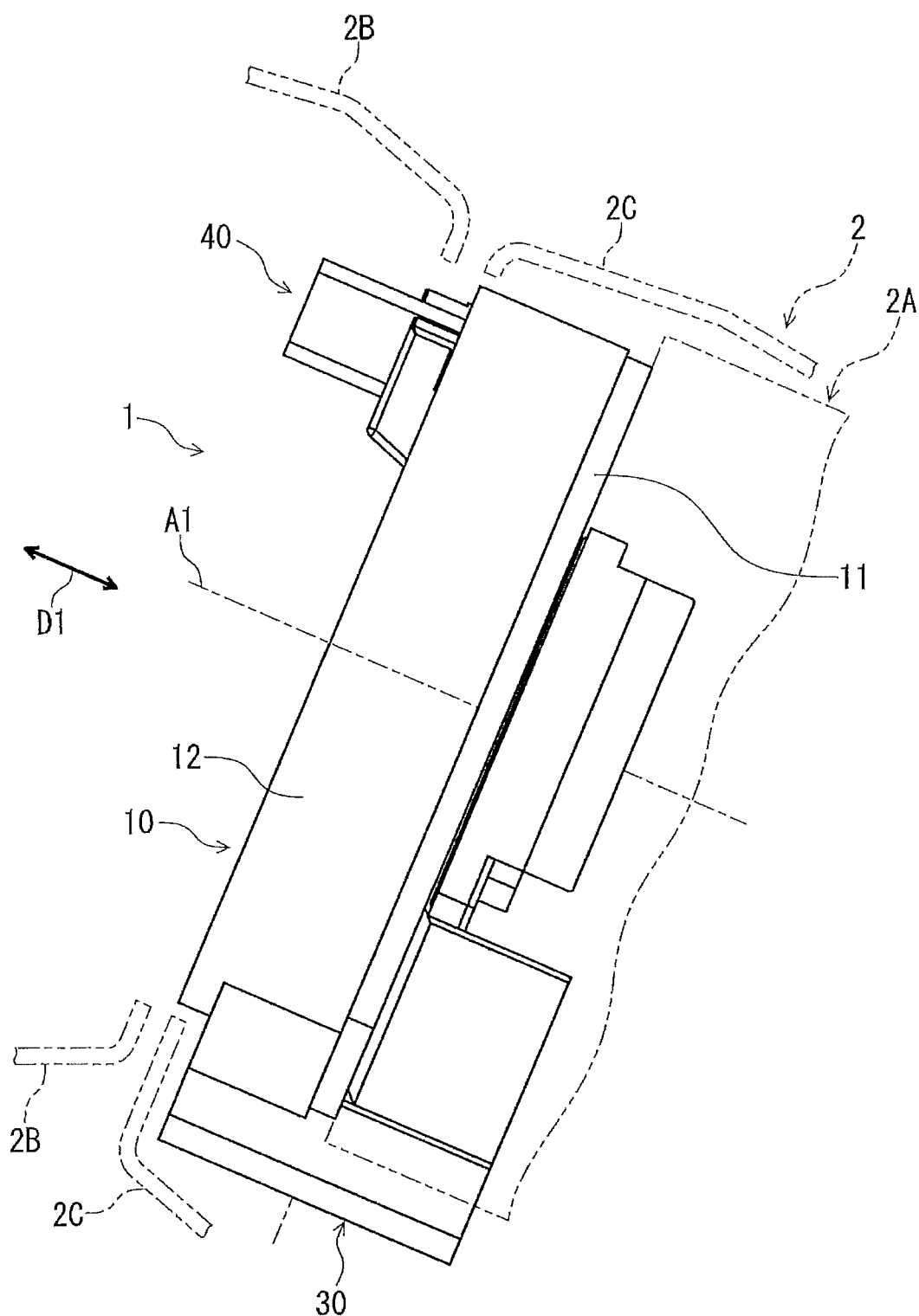
FIG. 1 is a side view of a rotary connector device according to the present embodiment.

Embodiments will be described below with reference to the drawings. In the drawings, the same reference signs indicate corresponding or identical configurations.

As illustrated in FIG. 1, a rotary connector device 1 according to the present embodiment includes a stator 10. The stator 10 is configured to be attached to a vehicle body 2. The vehicle body 2 includes, for example, a steering column module 2A, a steering lower cover 2B, and a steering column cover 2C. The stator 10 is configured to be fixed to the steering column module 2A.

Figure 2:
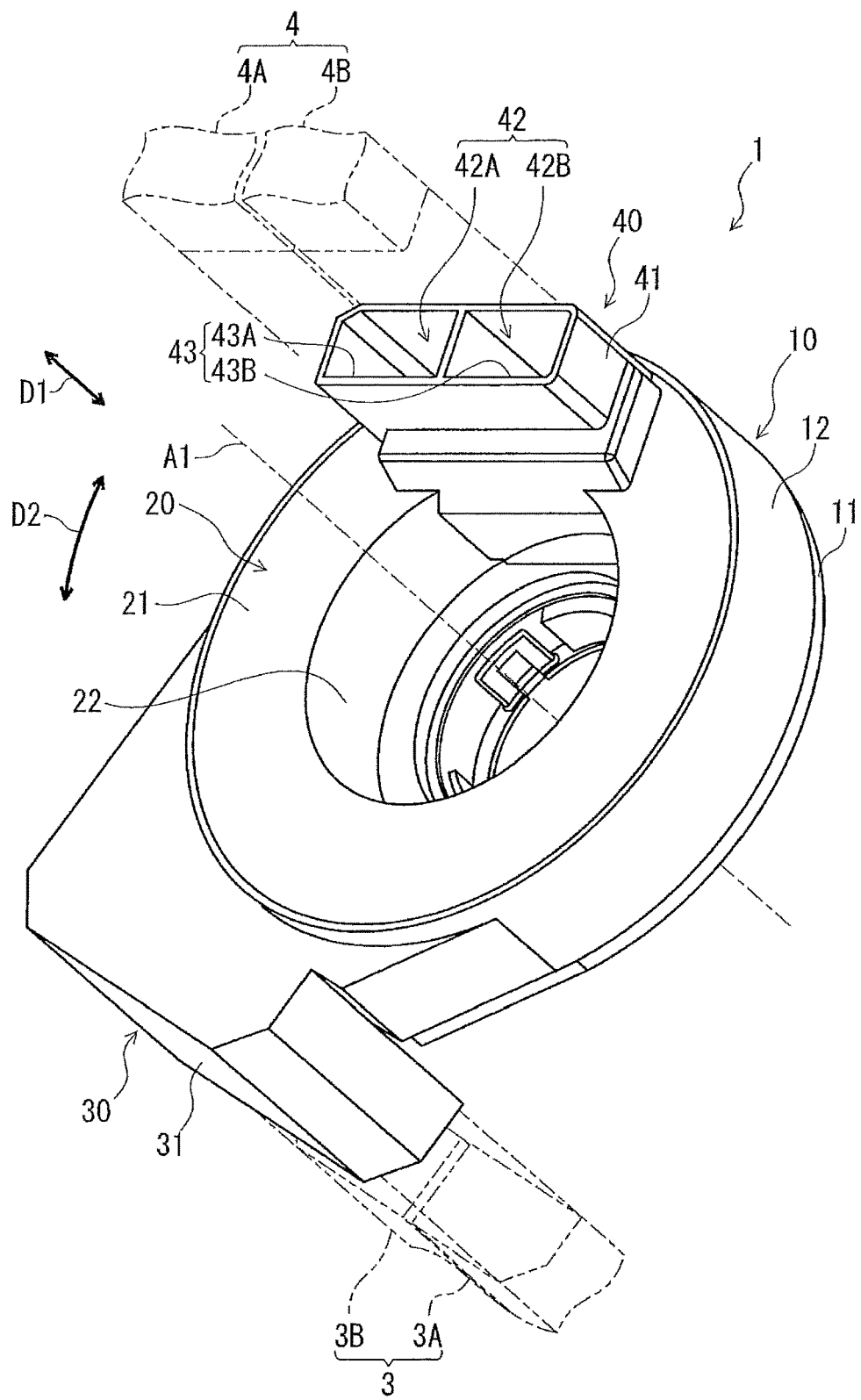
FIG. 2 is a perspective view of the rotary connector device illustrated in FIG. 1.

As illustrated in FIG. 2, the rotary connector device 1 includes a rotator 20, a first connector 30, and a second connector 40. The rotator 20 is rotatably provided about a rotation axis A1 with respect to the stator 10. The rotator 20 is configured to be fixed to a steering wheel. The first connector 30 is provided at the stator 10. The second connector 40 is provided at the rotator 20.

The first connector 30 is configured such that a vehicle-body-side connector 3 is removably mounted. The first connector 30 is configured to be electrically connected to the vehicle-body-side connector 3 that is attached to the first connector 30. The vehicle-body-side connector 3 is electrically connected to an electric circuit such as a controller. In the present embodiment, the vehicle-body-side connector 3 includes a plurality of connectors 3A and 3B. However, the total number of vehicle-body-side connectors 3 is not limited to the present embodiment.

The second connector 40 is configured such that a steering-side connector 4 is removably mounted. The second connector 40 is configured to be electrically connected to the steering-side connector 4 that is attached to the second connector 40. The steering-side connector 4 is electrically connected to the electrical circuits such as the steering wheel switches and the airbag devices. In the present embodiment, the steering-side connector 4 includes a plurality of connectors 4A and 4B. However, the total number of steering-side connectors 4 is not limited to the present embodiment.

Figure 3:
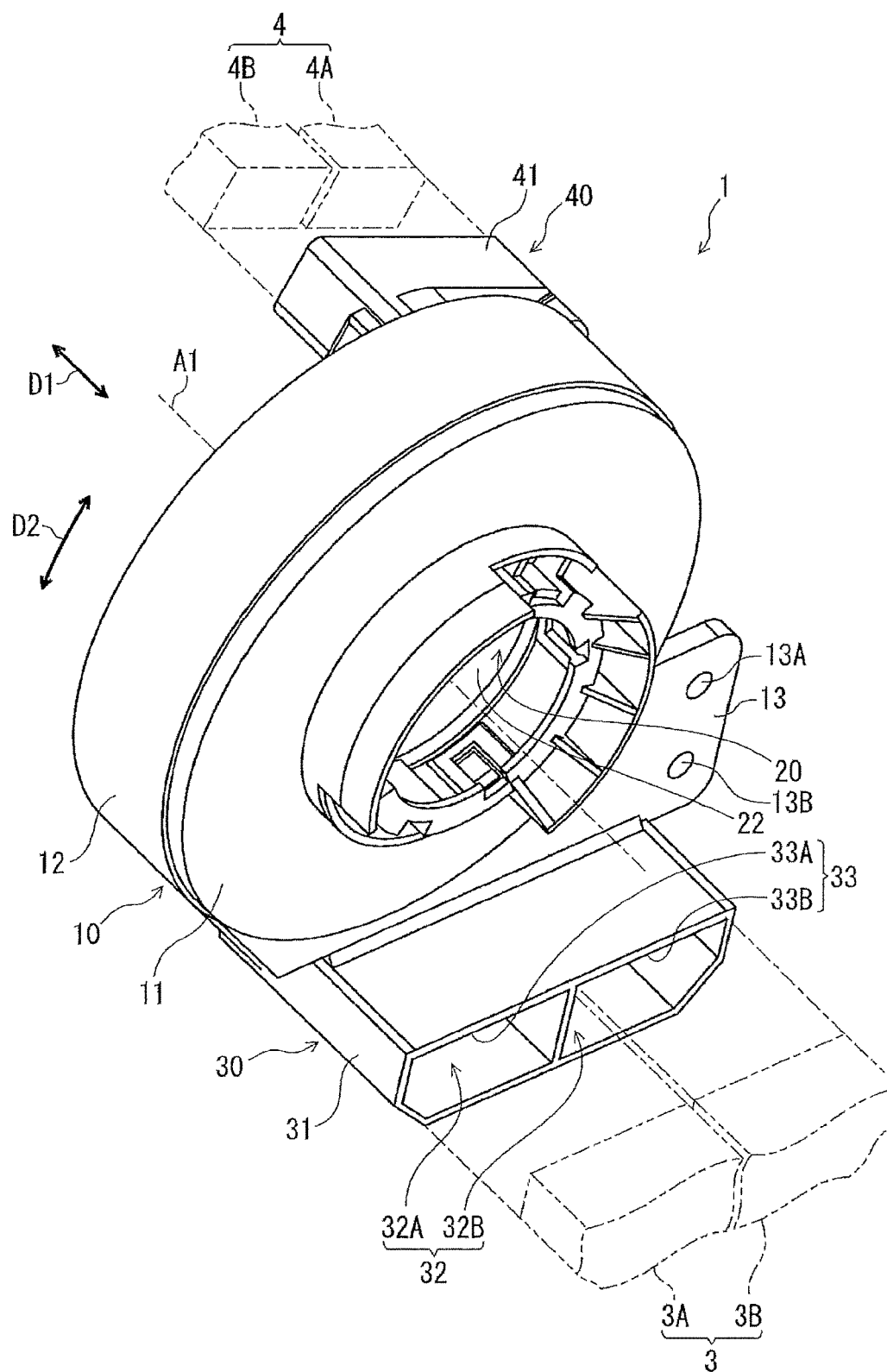
FIG. 3 is a perspective view of the rotary connector device illustrated in FIG. 1.

As illustrated in FIG. 3, the stator 10 includes a first ring plate 11 and an outer cylindrical portion 12 extending from the outer peripheral portion of the first ring plate 11 to an axial direction D1. The first connector 30 is provided at the first ring plate 11. The first connector 30 includes a first connector housing portion 31. The first connector housing portion 31 extends from the outer cylindrical portion 12 to radially outward and in the axial direction D1 with respect to the rotation axis A1.

The first connector 30 includes a first connector housing space 32 in which the vehicle-body-side connector 3 is disposed in a state where the vehicle-body-side connector 3 is electrically connected to the first connector 30. The first connector housing portion 31 includes the first connector housing space 32. The first connector housing space 32 includes a first connector opening 33 into which the vehicle-body-side connector 3 is inserted when the vehicle-body-side connector 3 is electrically connected to the first connector 30. The first connector 30 is disposed such that the vehicle-body-side connector 3 is inserted into the first connector housing space 32 along the axial direction D1. The first connector opening 33 opens in the axial direction D1. However, the first connector 30 may be disposed such that the vehicle-body-side connector 3 is inserted into the first connector housing space 32 along a direction different from the axial direction D1. The first connector opening 33 may open in a direction different from the axial direction D1. For example, the first connector 30 may be disposed such that the vehicle-body-side connector 3 is inserted into the first connector housing space 32 along a circumferential direction D2. The first connector opening 33 may be open in the circumferential direction D2.

In the present embodiment, the first connector housing space 32 includes a plurality of first housing spaces 32A and 32B. The first connector opening 33 includes a plurality of first openings 33A and 33B. The connector 3A of the vehicle-body-side connector 3 is disposed in the first housing space 32A in a state where the connector 3A of the vehicle-body-side connector 3 is electrically connected to the first connector 30. The connector 3B of the vehicle-body-side connector 3 is disposed in the first housing space 32B in a state where the connector 3B of the vehicle-body-side connector 3 is electrically connected to the first connector 30. The connector 3A of the vehicle-body-side connector 3 is inserted into the first opening 33A of the first connector opening 33 when the connector 3A of the vehicle-body-side connector 3 is electrically connected to the first connector 30. The connector 3B of the vehicle-body-side connector 3 is inserted into the first opening 33B of the first connector opening 33 when the connector 3B of the vehicle-body-side connector 3 is electrically connected to the first connector 30. However, the first connector housing space 32 may be one housing space or may include three or more housing spaces. The first connector opening 33 may be one opening or may include three or more openings.

As illustrated in FIG. 2, the rotator 20 includes a second ring plate 21 and an inner cylindrical portion 22 extending from the inner peripheral portion of the second ring plate 21 in the axial direction D1. The second connector 40 is provided at the second ring plate 21. The second connector 40 includes a second connector housing portion 41. The second connector housing portion 41 extends from the second ring plate 21 in the axial direction D1.

The second connector 40 includes a second connector housing space 42 in which the steering-side connector 4 is disposed in a state where the steering-side connector 4 is electrically connected to the second connector 40. The second connector housing portion 41 includes the second connector housing space 42. The second connector housing space 42 includes a second connector opening 43 into which the steering-side connector 4 is inserted when steering-side connector 4 is electrically connected to the second connector 40. The second connector 40 is disposed such that steering-side connector 4 is inserted into the second connector housing space 42 along the axial direction D1. The second connector opening 43 opens in the axial direction D1. However, the second connector 40 may be disposed such that the steering-side connector 4 is inserted into the second connector housing space 42 along a direction different from the axial direction D1. The second connector opening 43 may open in a direction different from the axial direction D1. For example, second connector 40 may be disposed such that the steering-side connector 4 is inserted into the second connector housing space 42 along the circumferential direction D2. The second connector opening 43 may be open in the circumferential direction D2.

In the present embodiment, the second connector housing space 42 includes a plurality of second housing spaces 42A and 42B. The second connector opening 43 includes a plurality of second openings 43A and 43B. The connector 4A of the steering-side connector 4 is disposed in the second housing space 42A in a state where the connector 4A of the steering-side connector 4 is electrically connected to the second connector 40. The connector 4B of the steering-side connector 4 is disposed in the second housing space 42B in a state where the connector 4B of the steering-side connector 4 is electrically connected to the second connector 40. The connector 4A of the steering-side connector 4 is inserted into the second opening 43A of the second connector opening 43 when the connector 4A of the steering-side connector 4 is electrically connected to the second connector 40. The connector 4B of the steering-side connector 4 is inserted into the second opening 43B of the second connector opening 43 when the connector 4B of the steering-side connector 4 is electrically connected to the second connector 40. However, the second connector housing space 42 may be one housing space or may include three or more housing spaces. The second connector opening 43 may be one opening or may include three or more openings.

Figure 4:
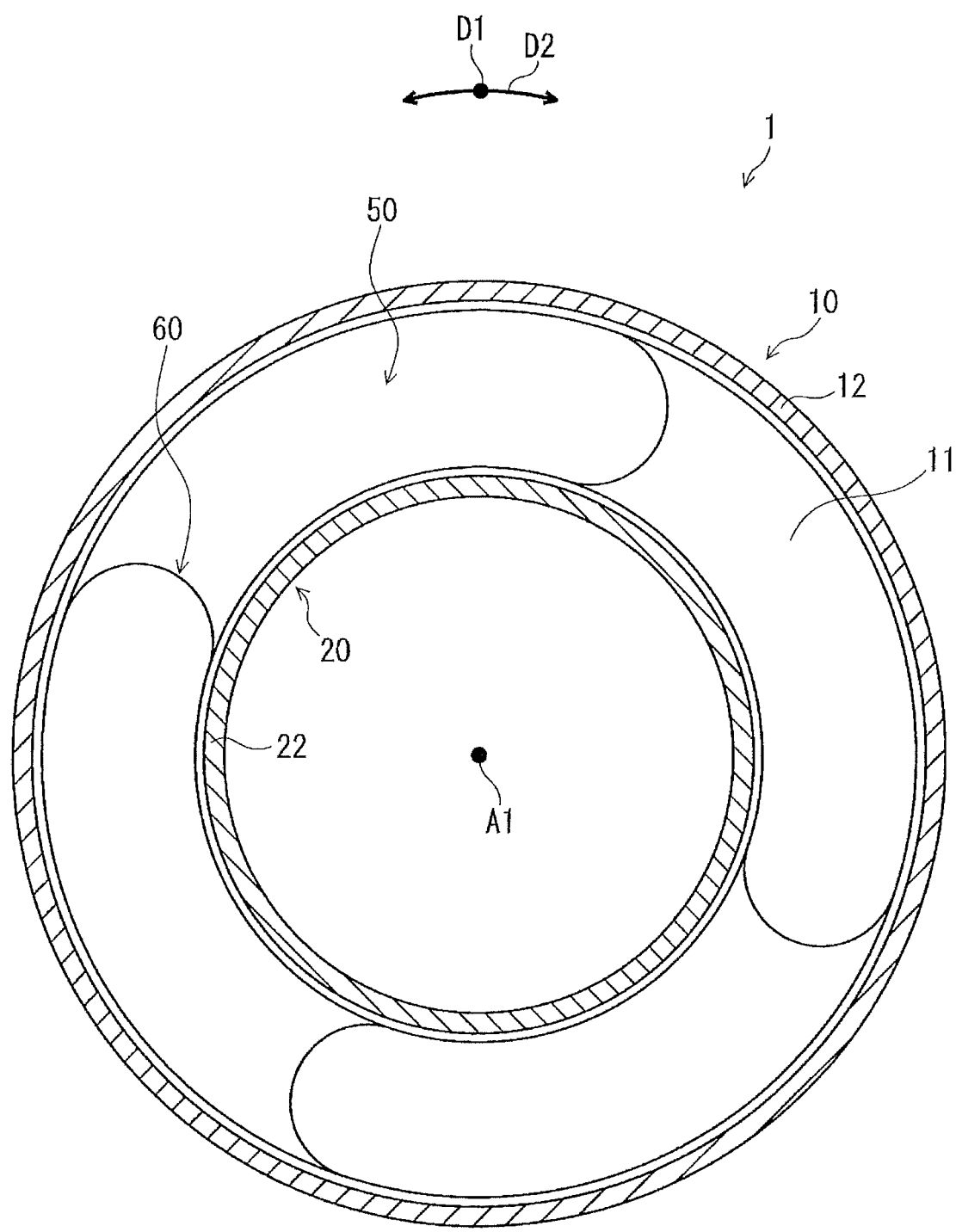
FIG. 4 is a cross-sectional view of the rotary connector device illustrated in FIG. 1.

As illustrated in FIG. 4, the stator 10 and the rotator 20 define a cable housing space 50 between the stator 10 and the rotator 20 provided to surround the rotation axis A1. For example, the cable housing space 50 is annular and extends in the circumferential direction D2 with respect to the rotation axis A1. The rotary connector device 1 includes an electrical cable 60. The electrical cable 60 electrically connects the first connector 30 to the second connector 40. The electrical cable 60 is disposed in the cable housing space 50. The electrical cable 60 is flexible and has a flat shape. The electrical cable 60 may also be referred to as a flexible flat cable or a flexible printed circuit board (FPC).

Figure 5:
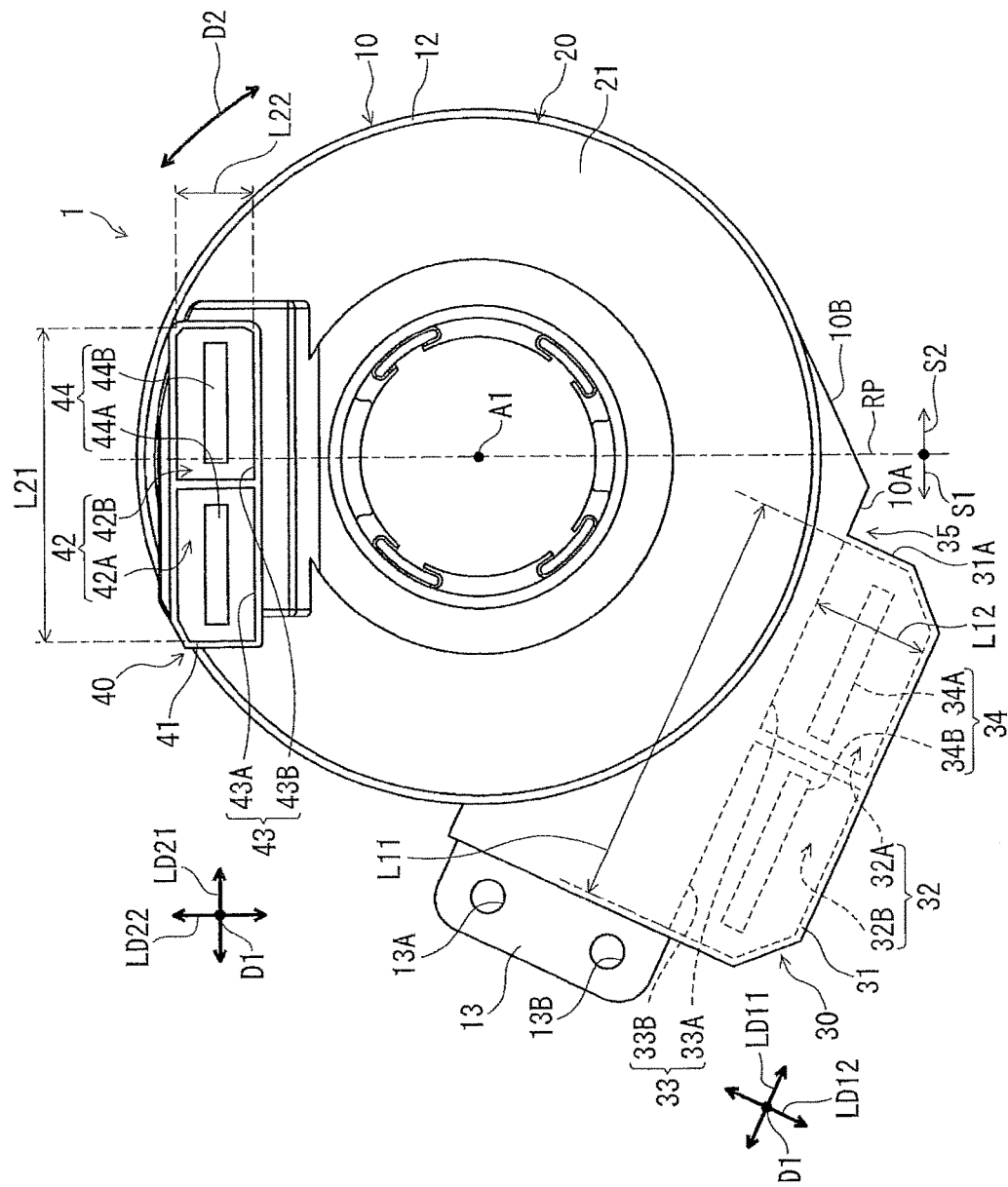
FIG. 5 is a plan view of the rotary connector device illustrated in FIG. 1.

As illustrated in FIG. 5, the first connector 30 includes a first lead block 34 located in the first connector housing space 32. The first lead block 34 includes a plurality of first busbars made of metal. The first lead block 34 is electrically connected to a first end of the electrical cable 60 (see FIG. 4). The first lead block 34 is electrically connected to a plurality of contacts of the vehicle-body-side connector 3 (see FIG. 2).

In the present embodiment, the first lead block 34 includes a plurality of first blocks 34A and 34B. The first block 34A is disposed in the first housing space 32A. The first block 34B is disposed in the first housing space 32B. However, the first lead block 34 may be one block or may include three or more blocks.

The second connector 40 includes a second lead block 44 located in the second connector housing space 42. The second lead block 44 includes a plurality of second busbars made of metal. The second lead block 44 is electrically connected to a second end of the electrical cable 60 (see FIG. 4). The second lead block 44 is electrically connected to a plurality of contacts of the steering-side connector 4 (see FIG. 3).

In the present embodiment, the second lead block 44 includes a plurality of second blocks 44A and 44B. The second block 44A is disposed in the second housing space 42A. The second block 44B is disposed in the second housing space 42B. However, the second lead block 44 may be one block or may include three or more blocks.

As illustrated in FIG. 5, when viewed from the axial direction D1 defined along the rotation axis A1 in a state where the stator 10 is attached to the vehicle body 2, the first connector housing space 32 is disposed not to overlap a vertical plane RP including the rotation axis A1. When viewed from the axial direction D1 in the state where the stator 10 is attached to the vehicle body 2, the first connector opening 33 is disposed not to overlap the vertical plane RP. When viewed from the axial direction D1 in the state where the stator 10 is attached to the vehicle body 2, the vertical plane RP defines a first space S1 and a second space S2. The vertical plane RP is disposed between the first space S1 and the second space S2. When viewed from the axial direction D1 in the state where the stator 10 is attached to the vehicle body 2, the first connector housing space 32 is disposed only in one of the first space S1 and the second space S2. In the present embodiment, when viewed from the axial direction D1 in the state where the stator 10 is attached to the vehicle body 2, the first connector housing space 32 is disposed only in the first space S1. However, when viewed from the axial direction D1 in the state where the stator 10 is attached to the vehicle body 2, the first connector housing space 32 may be disposed only in the second space S2.

In the present embodiment, when viewed from the axial direction D1 in the state where the stator 10 is attached to the vehicle body 2, the plurality of first housing spaces 32A and 32B are disposed not to overlap the vertical plane RP including the rotation axis A1. When viewed from the axial direction D1 in the state where the stator 10 is attached to the vehicle body 2, the plurality of the first openings 33A and 33B are disposed so as not to overlap the vertical plane RP. When viewed from the axial direction D1 in the state where the stator 10 is attached to the vehicle body 2, the plurality of the first housing spaces 32A and 32B are disposed only in the first space S1. However, when viewed from the axial direction D1 in the state where the stator 10 is attached to the vehicle body 2, the plurality of first housing spaces 32A and 32B may be disposed only in the second space S2.

The first connector housing space 32 extends in a first longitudinal direction LD11 when viewed from the axial direction D1. When viewed from the axial direction D1 in the state where the stator 10 is attached to the vehicle body 2, the first longitudinal direction LD11 of the first connector housing space 32 is inclined with respect to the vertical plane RP. However, when viewed from the axial direction D1 in the state where the stator 10 is attached to the vehicle body 2, the first longitudinal direction LD11 of the first connector housing space 32 need not be inclined with respect to the vertical plane RP. For example, when viewed from the axial direction D1 in the state where the stator 10 is attached to the vehicle body 2, the first longitudinal direction LD11 of the first connector housing space 32 may be orthogonal or parallel to the vertical plane RP.

When viewed from the axial direction D1 in the state where the stator 10 is attached to the vehicle body 2, the second connector housing space 42 is shifted from the vertical plane RP toward the first space S1. When viewed from the axial direction D1 in the state where the stator 10 is attached to the vehicle body 2, the second connector housing space 42 is disposed to overlap the vertical plane RP. However, when viewed from the axial direction D1 in the state where the stator 10 is attached to the vehicle body 2, the second connector housing space 42 may be shifted from the vertical plane RP toward the second space S2, or the center of the second connector housing space 42 may be located on the vertical plane RP. When viewed from the axial direction D1 in the state where the stator 10 is attached to the vehicle body 2, the second connector housing space 42 may be disposed not to overlap the vertical plane RP.

When viewed from the axial direction D1, the second connector housing space 42 extends in a second longitudinal direction LD21. When viewed from the axial direction D1 in a state where the rotator 20 is disposed at the neutral position with respect to the stator 10, the first longitudinal direction LD11 of the first connector housing space 32 is inclined with respect to the second longitudinal direction LD21 of the second connector housing space 42. However, when viewed from the axial direction D1 in the state where the rotator 20 is disposed at the neutral position with respect to the stator 10, the first longitudinal direction LD11 of the first connector housing space 32 may not be inclined with respect to the second longitudinal direction LD21 of the second connector housing space 42. For example, when viewed from the axial direction D1 in the state where the rotator 20 is disposed at the neutral position with respect to the stator 10, the first longitudinal direction LD11 of the first connector housing space 32 may be orthogonal to or parallel to the second longitudinal direction LD21 of the second connector housing space 42.

The neutral position of the rotator 20 is, for example, a position of the rotator 20 in the rotational direction with respect to the stator 10 when the steering is disposed in the neutral position. The neutral position of the steering is, for example, a position in the rotational direction of the steering when the vehicle goes straight.

The first connector housing space 32 has a first length L11 and a first width L12. The first length L11 is defined in the first longitudinal direction LD11. The first width L12 is defined in a first direction LD12 orthogonal to the first longitudinal direction LD11 and the axial direction D1. The first length L11 is longer than the first width L12. However, the first connector housing space 32 may not have the first longitudinal direction LD11. For example, the first length L11 may be equal to the first width L12.

The second connector housing space 42 has a second length L21 and a second width L22. The second length L21 is defined in the second longitudinal direction LD21. The second width L22 is defined in a second direction LD22 orthogonal to the second longitudinal direction LD21 and the axial direction D1. The second length L21 is longer than the second width L22. However, the second connector housing space 42 may not have the second longitudinal direction LD21. For example, the second length L21 may be equal to the second width L22.

In the present embodiment, the first length L11 is longer than the second length L21. The first width L12 is longer than the second width L22. However, the first length L11 may be the same as or shorter than the second length L21. The first width L12 may be the same as or shorter than the second width L22.

The first connector 30 is disposed below the rotation axis A1 in the state where the stator 10 is attached to the vehicle body 2. In the present embodiment, the entire first connector 30 is disposed below the rotation axis A1 in the state where the stator 10 is attached to the vehicle body 2. However, the first connector 30 may be partially disposed below the rotation axis A1 in the state where the stator 10 is attached to the vehicle body 2.

The first connector 30 protrudes radially outward from the stator 10 with respect to the rotation axis A1 to form a recess 35 by the stator 10 and the first connector 30. When viewed from the axial direction D1 in the state where the stator 10 is attached to the vehicle body 2, the recess 35 is at least partially disposed between the vertical plane RP and the first connector housing space 32. In the present embodiment, when viewed from the axial direction D1 in the state where the stator 10 is attached to the vehicle body 2, the entire recess 35 is disposed between the vertical plane RP and the first connector housing space 32. However, when viewed from the axial direction D1 in the state where the stator 10 is attached to the vehicle body 2, the recess 35 may be partially disposed between the vertical plane RP and the first connector housing space 32. Alternatively, the recess 35 may also be omitted from the rotary connector device 1.

The first connector housing portion 31 includes a first surface 31A. The stator 10 includes a second surface 10A and an inclined surface 10B. The first surface 31A extends from the second surface 10A in the first direction LD12. The second surface 10A extends from the first surface 31A in the first longitudinal direction LD11. The recess 35 is formed by the first surface 31A and the second surface 10A. The inclined surface 10B extends from the second surface 10A to the outer cylindrical portion 12. When viewed from the axial direction D1, the inclined surface 10B is inclined with respect to the second surface 10A and extends in the tangential direction of the outer peripheral surface of the outer cylindrical portion 12. The shape around the recess 35 is not limited to the present embodiment.

As illustrated in FIG. 5, the stator 10 includes a fixing portion 13. The fixing portion 13 is fixed to the vehicle body 2 by a fixing tool such as a screw or a bolt. The fixing portion 13 includes a plurality of through-holes 13A and 13B. The fixing portion 13 is disposed in the first space S1. Another fixing portion may be provided in the second space S2. As illustrated in FIG. 3, the fixing portion 13 protrudes from the first ring plate 11.

The rotary connector device 1 according to the present embodiment has the following aspects.

(1) As illustrated in FIG. 5, the rotary connector device 1 includes the stator 10, the rotator 20, the first connector 30, and the second connector 40. The stator 10 is configured to be attached to the vehicle body 2. The rotator 20 is rotatably provided about the rotation axis A1 with respect to the stator 10. The first connector 30 is provided at the stator 10. The second connector 40 is provided at the rotator 20. The first connector 30 includes the first connector housing space 32 in which the vehicle-body-side connector 3 is disposed in the state where the vehicle-body-side connector 3 is electrically connected to the first connector 30. When viewed from the axial direction D1 defined along the rotation axis A1 in the state where the stator 10 is attached to the vehicle body 2, the first connector housing space 32 is disposed not to overlap the vertical plane RP including the rotation axis A1. This makes it easy to secure a space around the knee of the driver.

More specifically, since the first connector housing space 32 is disposed not to overlap the vertical plane RP, it is easier to provide a space opposite to the first connector housing space 32 with respect to the vertical plane RP. By forming the steering column cover 2C along the inclined surface 10B and the outer cylindrical portion 12, the space (e.g., the space around the knee of the right foot where the accelerator or brake is operated) around the knee of the driver can be easily secured.

(2) As illustrated in FIG. 5, when viewed from the axial direction D1 in the state where the stator 10 is attached to the vehicle body 2, the vertical plane RP defines the first space S1 and the second space S2. When viewed from the axial direction D1 in the state where the stator 10 is attached to the vehicle body 2, the first connector housing space 32 is disposed only in one of the first space S1 and the second space S2. Thus, in a space, among the first space S1 and the second space S2, where the first connector housing space 32 is not disposed, it becomes easy to surely secure a space around the knee of the driver.

(3) As illustrated in FIG. 5, the second connector 40 includes the second connector housing space 42 in which the steering-side connector 4 is disposed in the state where the steering-side connector 4 is electrically connected to the second connector 40. When viewed from the axial direction D1 in the state where the stator 10 is attached to the vehicle body 2, the first connector housing space 32 is disposed only in the first space S1. When viewed from the axial direction D1 in the state where the stator 10 is attached to the vehicle body 2, the second connector housing space 42 is shifted from the vertical plane RP toward the first space S1.

(4) As illustrated in FIG. 5, when viewed from the axial direction D1 in the state where the stator 10 is attached to the vehicle body 2, the second connector housing space 42 is disposed to overlap the vertical plane RP.

(5) As illustrated in FIG. 5, the first connector housing space 32 includes a first connector opening 33 into which the vehicle-body-side connector 3 is inserted when vehicle-body-side connector 3 is electrically connected to the first connector 30. When viewed from the axial direction D1 in the state where the stator 10 is attached to the vehicle body 2, the first connector opening 33 is disposed not to overlap the vertical plane RP. This makes it easy to secure a space around the knee of the driver reliably.

(6) As illustrated in FIG. 5, when viewed from the axial direction D1, the first connector housing space 32 extends in the first longitudinal direction LD11. When viewed from the axial direction D1 in the state where the stator 10 is attached to the vehicle body 2, the first longitudinal direction LD11 of the first connector housing space 32 is inclined with respect to the vertical plane RP. Thus, the space around the stator 10 can be efficiently used.

(7) As illustrated in FIG. 5, the second connector 40 includes a second connector housing space 42 in which the steering-side connector 4 is disposed in the state where the steering-side connector 4 is electrically connected to the second connector 40. The second connector housing space 42 extends in the second longitudinal direction LD21 when viewed from the axial direction D1. When viewed from the axial direction D1 in the state where the rotator 20 is disposed at the neutral position with respect to the stator 10, the first longitudinal direction LD11 of the first connector housing space 32 is inclined with respect to the second longitudinal direction LD21 of the second connector housing space 42. Thus, the space around the stator 10 can be efficiently used.

(8) As illustrated in FIGS. 1 and 5, the first connector 30 is disposed below the rotation axis A1 in the state where the stator 10 is attached to the vehicle body 2. This makes it easy to secure a space around the knee of the driver reliably.

(9) As illustrated in FIG. 5, the first connector 30 protrudes radially outward from the stator 10 with respect to the rotation axis A1 to form a recess 35 by the stator 10 and the first connector 30. When viewed from the axial direction D1 in the state where the stator 10 is attached to the vehicle body 2, the recess 35 is at least partially disposed between the vertical plane RP and the first connector housing space 32. Thus, even when the first connector 30 is configured to protrude radially outward from the stator 10, the space around the knee of the driver can be more easily secured by the recess 35.

(10) As illustrated in FIG. 5, the first connector 30 is disposed such that the vehicle-body-side connector 3 is inserted into the first connector housing space 32 along the axial direction D1. This makes it easier to secure the space around the knee of the driver than, for example, a configuration in which the vehicle-body-side connector 3 is inserted into the first connector housing space 32 along the circumferential direction D2.

In the present application, the term "comprise" and its derivatives are open-ended terms for explaining the existence of a component, and the existence of other components not described is not excluded. This also applies to "have", "include" and their derivatives.

In the present application, ordinal numbers such as "first" and "second" are merely terms used to identify a configuration and do not have any other meaning (e.g., a specific order). For example, the presence of "first element" does not imply the presence of "second element", and the presence of "second element" does not imply the presence of the "first element".

Also, the expressions "parallel," "orthogonal," and "coincident" in the present disclosure are not to be strictly construed and include the meanings "substantially parallel", "substantially orthogonal", and "substantially coincident", respectively. In addition, other expressions related to the arrangement are not strictly construed.

The expression "at least one of A and B" in the present disclosure also includes, for example, all of (1) only A, (2) only B, and (3) both A and B. The expression "at least one of A, B and C" includes, for example, all of (1) only A, (2) only B, (3) only C, (4) A and B, (5) B and C, (6) A and C, and (7) A, B and C. In the present disclosure, the expression "at least one of A and B" is not construed as "at least one of A and at least one of B".

It is apparent from the above disclosure that various changes and modifications of the disclosure are possible. Accordingly, the disclosure may be implemented in a manner different from the specific disclosure of the present application without departing from the spirit of the disclosure.

What is claimed is:

1. A rotary connector device comprising:
   a stator configured to be attached to a vehicle body;
   a rotator provided rotatably about a rotation axis with respect to the stator;
   a first connector provided at the stator;
   a second connector provided at the rotator;
   the first connector comprising a first connector housing space in which a vehicle-body-side connector is disposed in a state where the vehicle-body-side connector is electrically connected to the first connector;
   when viewed from an axial direction defined along the rotation axis in a state where the stator is attached to the vehicle body, the first connector housing space being disposed not to overlap a vertical plane including the rotation axis;
   the second connector comprising a second connector housing space in which a steering-side connector is disposed in a state where the steering-side connector is electrically connected to the second connector; and
   the second connector housing space being disposed to overlap the vertical plane when viewed from the axial direction in a state where the first connector housing space is disposed not to overlap the vertical plane including the rotation axis and a state where the rotator is disposed at a neutral position with respect to the stator.

2. The rotary connector device according to claim 1, wherein
   when viewed from the axial direction in the state where the stator is attached to the vehicle body, the vertical plane defines a first space and a second space, and
   when viewed from the axial direction in the state where the stator is attached to the vehicle body, the first connector housing space is disposed only in one of the first space and the second space.

3. The rotary connector device according to claim 2, wherein
   when viewed from the axial direction in the state where the stator is attached to the vehicle body, the first connector housing space is disposed only in the first space, and
   when viewed from the axial direction in the state where the stator is attached to the vehicle body, the second connector housing space is offset from the vertical plane toward the first space.

4. The rotary connector device according to claim 2, wherein
   when viewed from the axial direction in the state where the stator is attached to the vehicle body, the first connector housing space is disposed only in the first space, and
   when viewed from the axial direction in the state where the stator is attached to the vehicle body and the state where the rotator is disposed at the neutral position with respect to the stator, the second connector housing space is disposed in both the first space and the second space.

5. The rotary connector device according to claim 1, wherein
   the first connector housing space comprises a first connector opening into which the vehicle-body-side connector is inserted when the vehicle-body-side connector is electrically connected to the first connector, and
   when viewed from the axial direction in the state where the stator is attached to the vehicle body, the first connector opening is disposed not to overlap the vertical plane.

6. The rotary connector device according to claim 1, wherein
   when viewed from the axial direction, the first connector housing space extends in a first longitudinal direction, and
   when viewed from the axial direction in the state where the stator is attached to the vehicle body, the first longitudinal direction of the first connector housing space is inclined with respect to the vertical plane.

7. The rotary connector device according to claim 6, wherein
   the second connector housing space extends in a second longitudinal direction when viewed from the axial direction, and
   when viewed from the axial direction in the state where the rotator is disposed at the neutral position with respect to the stator, the first longitudinal direction of the first connector housing space is inclined with respect to the second longitudinal direction of the second connector housing space.

8. The rotary connector device according to claim 1, wherein
   the first connector is disposed below the rotation axis in the state where the stator is attached to the vehicle body.

9. The rotary connector device according to claim 1, wherein
   the first connector protrudes radially outward from the stator with respect to the rotation axis to form a recess by the stator and the first connector, and
   when viewed from the axial direction in the state where the stator is attached to the vehicle body, the recess is at least partially disposed between the vertical plane and the first connector housing space.

10. The rotary connector device according to claim 1, wherein
    the first connector is disposed such that the vehicle-body-side connector is inserted into the first connector housing space along the axial direction.

11. The rotary connector device according to claim 1, wherein the second connector housing space extends in a second longitudinal direction when viewed from the axial direction, and the vertical plane is defined to be orthogonal to the second longitudinal direction when viewed from the axial direction in the state where the rotator is disposed at the neutral position with respect to the stator.

12. The rotary connector device according to claim 1, wherein the stator includes a fixing portion configured to be fixed to the vehicle body, when viewed from the axial direction in the state where the stator is attached to the vehicle body, the vertical plane defines a first space and a second space, when viewed from the axial direction in the state where the stator is attached to the vehicle body, the first connector housing space is disposed only in one of the first space and the second space, and when viewed from the axial direction in the state where the stator is attached to the vehicle body, the fixing portion is disposed only in the one of the first space and the second space.

13. The rotary connector device according to claim 12, wherein the fixing portion includes at least one through-hole, and when viewed from the axial direction in the state where the stator is attached to the vehicle body, the at least one through-hole is disposed only in the one of the first space and the second space.

14. The rotary connector device according to claim 1, wherein when viewed from the axial direction, the first connector housing space extends in a first longitudinal direction, the first connector housing space has a first length and a first width, the first length is defined in the first longitudinal direction, the first width is defined in a first direction orthogonal to the first longitudinal direction and the axial direction, and the first length is longer than the first width.

15. The rotary connector device according to claim 14, wherein the first connector includes a first connector housing portion including the first connector housing space, the first connector housing portion includes a first surface, the stator includes a second surface, the first surface extends from the second surface in the first direction, the second surface extends from the first surface in the first longitudinal direction, and the recess is formed by the first surface and the second surface.

16. The rotary connector device according to claim 15, wherein the stator includes an inclined surface and an outer cylindrical portion, the inclined surface extends from the second surface to the outer cylindrical portion, and when viewed from the axial direction, the inclined surface is inclined with respect to the second surface.

17. The rotary connector device according to claim 16, wherein when viewed from the axial direction, the inclined surface extends in a tangential direction of an outer peripheral surface of the outer cylindrical portion.

18. The rotary connector device according to claim 16, wherein when viewed from the axial direction in the state where the stator is attached to the vehicle body, the vertical plane defines a first space and a second space, when viewed from the axial direction in the state where the stator is attached to the vehicle body, the first connector housing space is disposed only in one of the first space and the second space, and the inclined surface and the outer cylindrical portion partially define a space which is at least partially disposed in another of the first space and the second space.

19. The rotary connector device according to claim 1, wherein when viewed from the axial direction, the first connector housing space extends in a first longitudinal direction, the first connector housing space has a first length defined in the first longitudinal direction, the second connector housing space extends in a second longitudinal direction when viewed from the axial direction, the second connector housing space has a second length defined in the second longitudinal direction, and the first length is longer than the second length.

* * * * *